United States Patent [19]

Onodera

[11] Patent Number: 4,706,268

[45] Date of Patent: Nov. 10, 1987

[54] DIGITAL RADIOGRAPHY APPARATUS

[75] Inventor: Toshihiro Onodera, Kunitachi, Japan

[73] Assignee: Kabushiki Kaisha Toshiba, Tokyo, Japan

[21] Appl. No.: 676,834

[22] Filed: Nov. 30, 1984

[30] Foreign Application Priority Data

Nov. 30, 1983 [JP] Japan .............................. 58-225717

[51] Int. Cl.[4] .............................................. H05G 1/64
[52] U.S. Cl. ...................................... 378/99; 378/105; 378/106; 378/111; 378/112; 378/115; 378/116; 358/111
[58] Field of Search .................. 378/99, 105, 106, 111, 378/112, 115, 116; 358/111

[56] References Cited

U.S. PATENT DOCUMENTS

| | | |
|---|---|---|
| 3,916,192 | 10/1975 | Schmittmann et al. . |
| 3,976,889 | 8/1976 | Noske et al. . |
| 4,160,266 | 7/1979 | Kurihara . |
| 4,185,198 | 1/1980 | Fujimoto ............................ 378/116 |
| 4,213,049 | 7/1980 | Seifert ................................ 378/115 |
| 4,255,662 | 3/1981 | Waterkamp ........................ 378/116 |
| 4,317,039 | 2/1982 | Romandi . |
| 4,383,328 | 5/1983 | Kurihara et al. . |
| 4,403,150 | 9/1983 | Kurihara et al. . |
| 4,458,267 | 7/1984 | Dolazza ............................. 378/99 |
| 4,504,895 | 3/1985 | Steigerwald ...................... 378/105 |
| 4,533,946 | 8/1985 | Yasuhara et al. ................. 378/99 |

OTHER PUBLICATIONS

Nakashika et al., "Latest Diagnostic System for Cirou-latory Organs" 43 Toshiba Review Intl Ed. 24-29, Jul.-Aug. 1969.

Primary Examiner—Carolyn E. Fields
Assistant Examiner—John C. Freeman
Attorney, Agent, or Firm—Banner, Birch, McKie & Beckett

[57] ABSTRACT

Digital radiography apparatus uses a resonance-type high frequency inverter having a main switch in series with an auxiliary switch. An X-ray tube receives the pulsed power from the high frequency inverter, after voltage ampliflication and rectification, emitting pulsed X-rays to a patient. A TV camera obtains X-ray transmission images of the patient, and an image processor generates a visual diagnostic image by subtracting one X-ray transmission image from another. The high frequency inverter circuit is controlled synchronously with the processing operation of the image processor.

5 Claims, 19 Drawing Figures

DIGITAL RADIOGRAPHY APPARATUS

BACKGROUND OF THE INVENTION

1. Technical Field

This invention relates to digital radiography apparatus for processing a plurality of X-ray images to produce a clear diagnostic image.

2. Description of the Prior Art

In the X-ray diagnostic field, a recent development is an apparatus which develops a diagnostic image of a patient (or other object) by illuminating the patient with X-rays and then using a television camera employing an X-ray image intensifier to detect the X-ray transmission image of the patient. The most widely accepted of these apparatus employs the so-called digital subtraction process, in which the final diagnostic image displayed is the difference between X-ray images of a selected region of the patient obtained before and after the injection of a radiopaque, or X-ray contrast, medium into the region.

The subtraction process involves first producing an X-ray image of the region before the injection of the contrast medium. This first image is used as a "mask image" to be subtracted from other images. After the injection of the X-ray contrast medium, a second X-ray image of the same region, the contrast image, is produced. Both the mask image and the contrast image are digitized; and then they are subjected to digital subtraction. For example, in angiography of the cranium, digital subtraction is carried between an ordinary cranial X-ray image made before the injection of the radiopaque medium and an X-ray contrast image made after injection in which, in effect, the cranial X-ray image and an angiographic image are superimposed. In this way, the data concerning the cranial X-ray image is eliminated.

One difficulty with this subtraction process is the short period during which the contrast medium is effective. Conventionally, therefore, in obtaining a diagnostic image of a region of a patient which moves very slowly (for example, blood vessels), the contrast medium is injected at a time $t_0$ as shown in FIG. 1; and, after the lapse of several seconds in which the contrast medium is allowed to spread, X-ray images are taken at intervals of, for example, 1 second and used to develop mask image M and sucessive contrast images $S_1$, $S_2$, $S_3$, ... In order to avoid exposing the patient to a large dosage of radiation, the X-rays are generated as pulses by using a tetrode between the high voltage generator and the X-ray tube to switch the power supply to the tube. Because tetrodes are expensive and suffer from the typical short service life of all vacuum tubes, this arrangement is undesirable.

Furthermore, an additional problem is presented when one attempts to obtain a diagnostic image of a region which moves relatively rapidly, such as the heart. In this case, as shown in FIG. 2, mask image M is obtained before injection; and contrast images $S_1$, $S_2$, $S_3$, ... are obtained afterward at intervals as short as 33 ms. However, when X-ray images are to be obtained at such short intervals, a tetrode is incapable of rapidly switching the power supply and still providing stable X-ray tube drive pulses, for reasons involving the well known operating characteristics of the tetrode. Consequently, as shown in waveform a of FIG. 2, the patient is continuously irradiated with X-rays throughout the period during which image processing is performed; and detection of separate contrast images is achieved by electrical sampling within the image processing unit itself. Because of the large amount of radiation to which the patient is thus exposed, there is an urgent requirement for development of a technique whereby stable X-ray tube drive pulses are produced with a small pulse repetition interval (PRI) as shown in waveform b of FIG. 2.

SUMMARY OF THE INVENTION

An object of the present invention is to generate stable X-ray pulses in a digital radiography apparatus irrespective of the PRI so as to obtain a clear diagnostic image with each pulsed X-ray.

In order to achieve the above object, the high voltage generator used to supply power to the X-ray tube does not employ a tetrode but instead includes a resonance-type high frequency inverter controlled in synchronism with the image processor. By using a resonance-type high frequency inverter, pulses of power can be supplied very effectively to the X-ray tube by switching the inverter. Furthermore, if control of the inverter's output is carried out using nonlinear feedback, the rise time of the pulses can easily be reduced below 1 ms. With such pulses, X-ray exposure of the living body can be reduced to a low level, and stable diagnostic images can be obtained.

DETAILED DESCRIPTION OF THE PREFERRED EMBODIMENT

Figure 1:
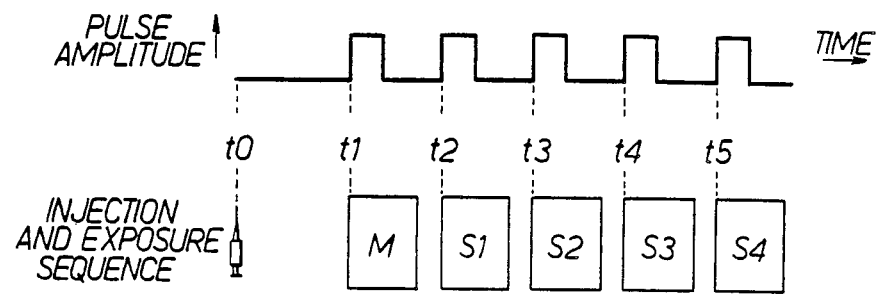
FIG. 1 is a diagram of the injection and exposure sequence for digital radiography of a slowly-moving region of a patient.
Figure 2:
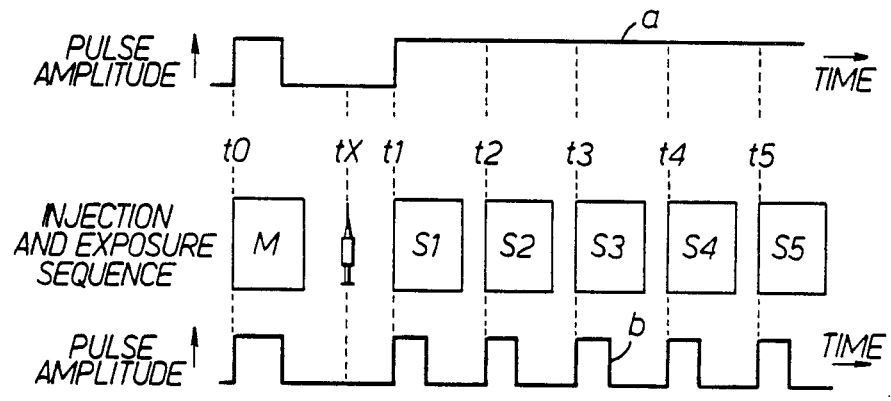
FIG. 2 is a diagram of the injection and exposure sequence for digital radiography of a rapidly-moving region of a patient.
Figure 3:
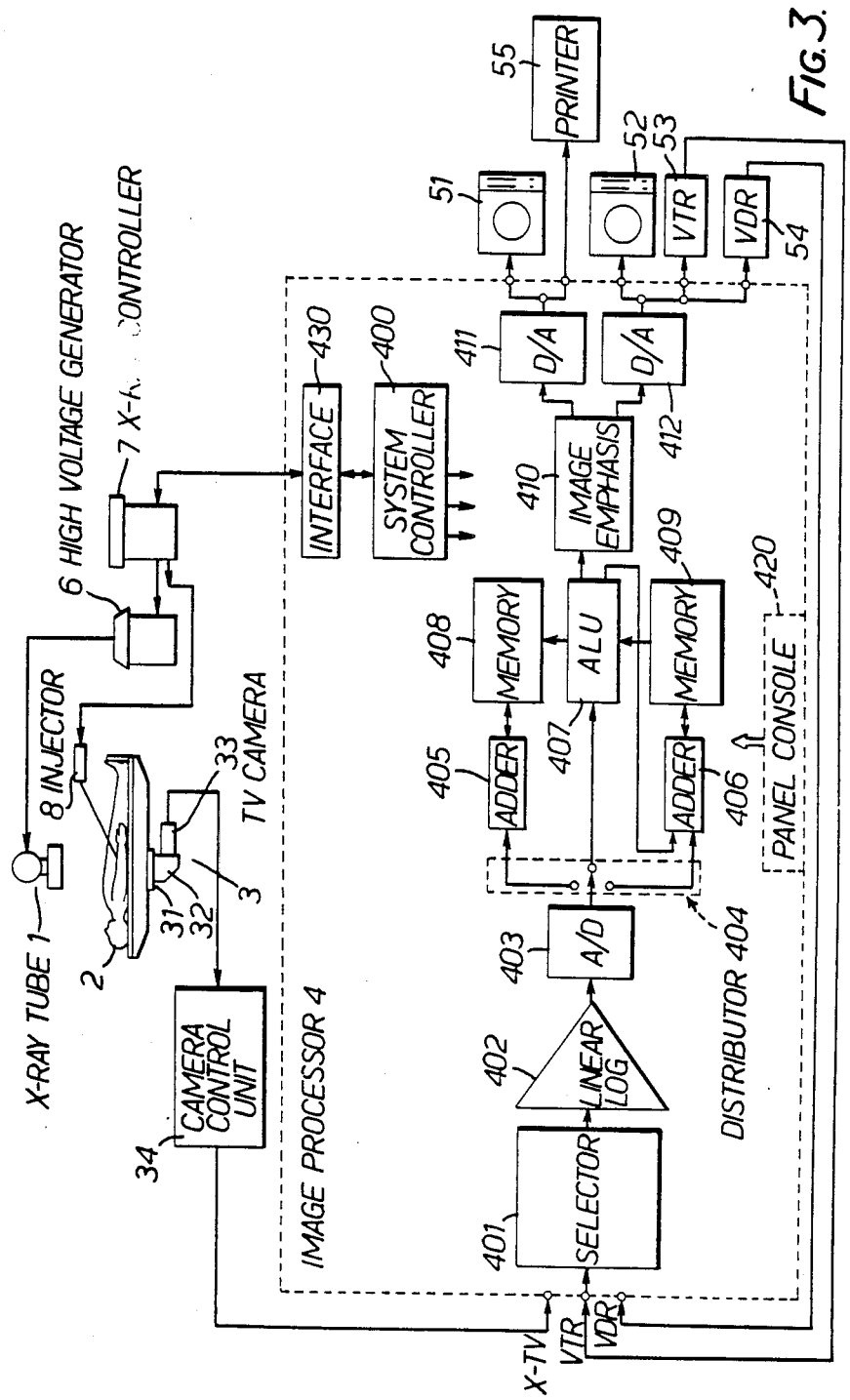
FIG. 3 is a block diagram showing a typical radiography apparatus which may employ the present invention.

FIG. 3 is a block diagram showing a typical digital radiography apparatus which may employ this invention. X-ray tube 1 illuminates a region of patient 2 with X-rays, which penetrate the patient and are detected by a detecting system 3, usually comprising image intensifier 31, optical system 32, X-ray television camera 33 and camera control unit 34. Optical system 32 adjusts the quantity of radiation incident on camera 33 in response to X-rays actually detected. Camera control unit 34 outputs sequence signals corresponding to the X-ray image of the patient.

An image processor 4 processes X-ray images obtained by detecting system 3 and generates visible diagnostic images. For example, in the case of diagnosis of blood vessels, images of bone are unnecessary; these are eliminated by digital subtraction in image processor 4.

In FIG. 3, a typical image processor is shown which utilizes the digital subtraction process. System controller 400 exerts overall control of image processor 4. Linear-log converter 402 converts a linear analog input signal to a logarithmic analog output signal; this is then digitalized by A/D converter 403. Distributor 404 distributes the output of A/D converter 403 to adder 405, adder 406, or ALU (arithmetic efficient 407 as instructed by system controller 400. Memory 408 stores the digital mask image representing the patient before the injection of the X-ray contrast medium, while memory 409 stores a contrast image representing the patient after the injection of the X-ray contrast medium. ALU 407 performs the subtraction and outputs the difference between the mask and contrast images to image emphasis circuit 410, which processes the difference image into a clearer image by emphasizing edges of the image or by gamma adjustment. The output of image emphasis circuit 410 is converted into a series of analog signals by D/A converter 411 and displayed as a visual image by monitor 51. Usually only the difference image is displayed; however, one of the images stored in memory 408 or 409 may also be displayed visually by monitor 52, similarly obtaining analog signals using D/A converter 412. Further, these visual images may be recorded into recording devices such as VTR (video tape recorder) 53 or VDR (video data recorder or video disc recorder) 54 or obtained in the form of a hard copy by printer 55. Panel console 420 provides for manual control of the digital radiography apparatus by an operator or physician. For example, processing modes may be selected through mode keys (not shown).

System controller 400 also controls the timing of X-ray pulses; consequently, it is connected to X-ray controller 7 through interface circuit 430. In response to control signals from system controller 400, X-ray controller 7 supplies necessary signals to high voltage generator 6.

Figure 4:
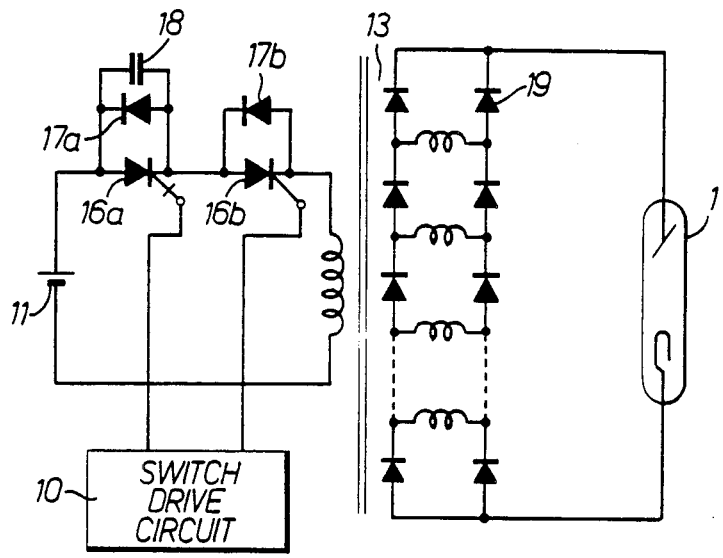
FIG. 4 is a schematic diagram of one embodiment of the high-voltage generator of FIG. 3.

High-voltage generator 6 is constructed, for example as shown in the schematic diagram of FIG. 4, with a voltage-resonant-type high frequency inverter. The primary winding of transformer 13 is connected to a direct current power source 11 in series with main switch 16a and auxiliary switch 16b. Direct current power source 11 comprises a commercial alternating current power supply and a rectifier for rectifying the commercial voltage. Damping diodes 17a, 17b are connected in parallel (anode-to-cathode) with switches 16a and 16b. Resonance capacitor 18 is connected in parallel with main switch 16a. Switches 16a, 16b may consist for example of thyristors, whose switching is controlled by switch drive circuit 10. The output of the secondary winding of transformer 13 is rectified by diodes 19 and supplied to X-ray tube 1. The transformer secondary winding is divided into a plurality of windings, the outputs of which are rectified by diodes 19, added, and then supplied to X-ray tube 1.

Figure 5:
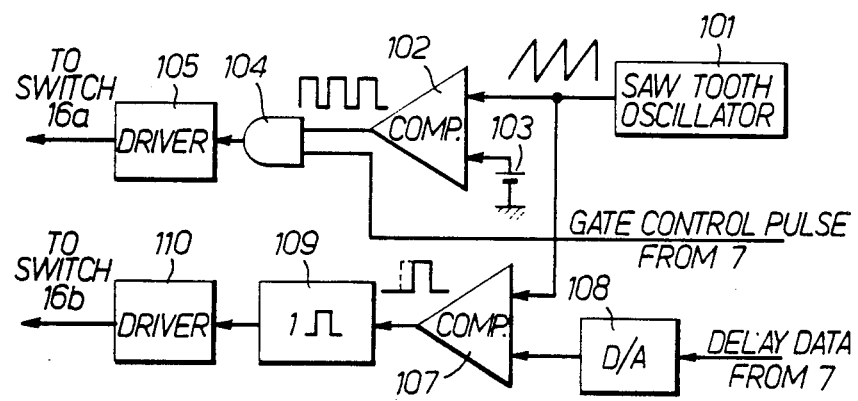
FIG. 5 is a block diagram of the switch drive circuit of FIG. 4.

FIG. 5 is a block diagram of switch drive circuit 10 in FIG. 4. Drive circuit 10 includes sawtooth oscillator 101, whose frequency is for example 10 kHz, supplying its output to comparator 102, which compares the output with reference voltage 103 so as to output a train of pulses having a constant duty cycle Ton/T, wherein T is the pulse repetition interval (PRI) and Ton is the period during which main switch 16a becomes conductive. The output pulses from comparator 102 are supplied to main switch 16a through driver 105 when gate 104 is open. Gate 104 is controlled by a gate control pulse from X-ray controller 7.

Figure 6A:
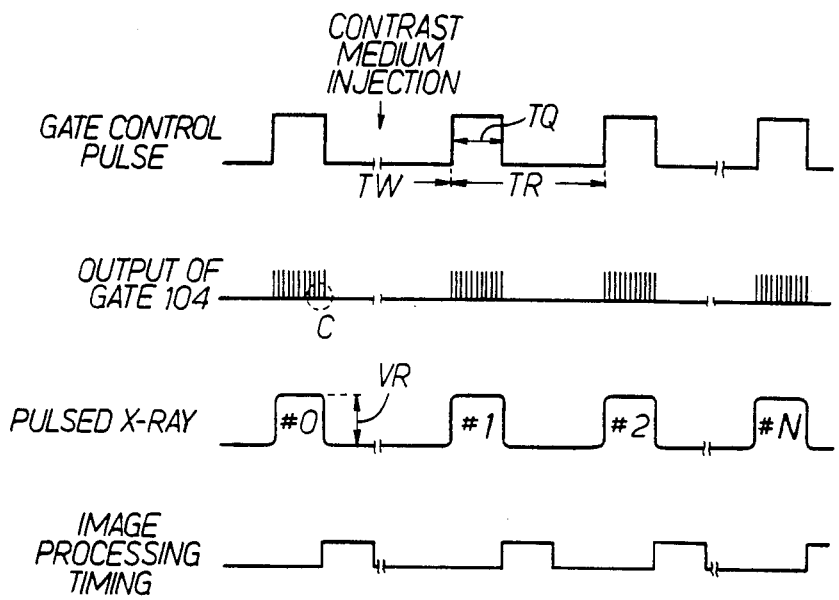
FIG. 6A is a diagram illustrating various waveforms occurring in the image processor of FIG. 3.
Figure 6B:
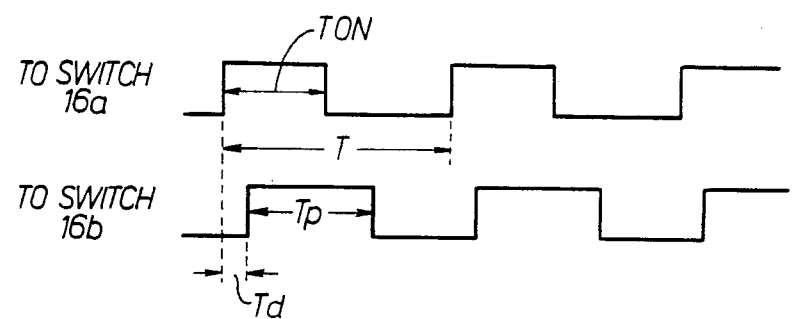
FIG. 6B is an enlarged diagram of the portion of FIG. 6A shown in dashed circle C.

The output of sawtooth oscillator 101 is also supplied to comparator 107, which compares the output with a delay control voltage from D/A converter 108, which converts delay data from X-ray controller 7 into an analog voltage. Output pulses from comparator 107 are therefore delayed, with respect to the output pulses of comparator 102, by a delay time Td corresponding to the delay data. The output of comparator 107 is supplied to monostable multivibrator 109 which establishes its pulse width Tp. The output pulses from monostable multivibrator 109 are supplied to auxiliary switch element 16b. Waveforms of pulses supplied to switches 16a and 16b are shown in FIG. 6B.

Image processor 4 of FIG. 3 has several image processing modes. For example, mode 1 may be for obtaining a visual difference image of blood vessels, which are substantially stationary; and mode 2 may be for obtaining a visual difference image of the heart, which has relatively fast movement. In mode 1, X-ray pulses should be emitted for example with a PRP of 1 second, while the PRP should be for example 33 ms in mode 2, and preferably the pulse amplitude should also be changed between modes. Therefore, system controller 400 contains a plurality of program routines for image processing, each corresponding to a different selectable mode. One program routine is executed in response to depression of each mode key (not shown) on panel console 420. System controller 400 controls image processor 4 according to the stored program routines, in a well known manner. The program additionally contains parameter data for the sequence of X-ray pulses corresponding to each mode. Parameter data supplied to X-ray controller 7 through interface 430 is synchronized with the image processing operation. Parameter data includes, for example, waiting time Tw (the time between the leading edge of the mask image pulse and the leading edge of the first contrast image pulse), pulse width Tq, contrast pulse repetition period Tr, and delay data. X-ray controller 7 generates the gate control pulse for controlling gate 104 according to all of the above parameter data except the delay data. (The waveform of the gate control pulse is shown in FIG. 6A). Controller 7 may be a microprocessor or a combination of timers and pulse generators, as described below. Thus, in response to high frequency pulses from drive circuit 10, the inverter circuit of high voltage generator 6 induces high voltage alternating current in the secondary winding of transformer 13 in FIG. 4. This high voltage is rectified by diodes 19 and supplied to X-ray tube 1 as direct current power pulses shown in FIG. 6A. The interval and width of these power pulses are determined by Tw, Tq and Tr, while their height Vh is determined by the delay data.

System controller 400 controls camera control unit 34 so as to supply a transmission image in response to each X-ray pulse. In response to the leading X-ray pulse (#0), the image obtained by detecting system 3 is stored in memory 408 as the mask image. Subsequent images are added by adder 406 and stored in memory 409 in response to X-ray pulses #1, #2, ..., #N. ALU 407 subtracts the corresponding picture elements in memories 408, 409 and obtains subtracted images, which may be displayed on monitor 51 or recorded into VTR 53.

Figure 7:
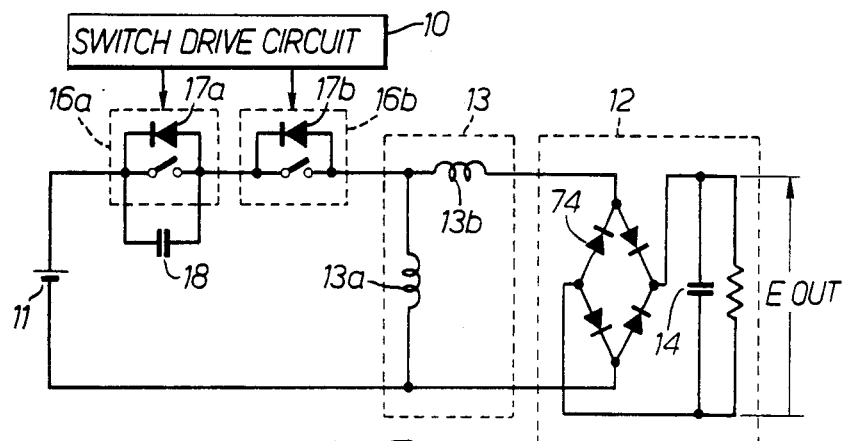
FIG. 7 is a schematic diagram of the equivalent circuit of the high-voltage generator of FIG. 4.
Figure 9A:
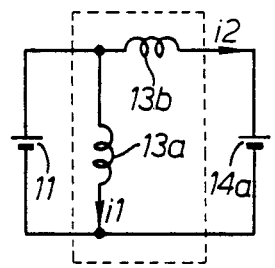
FIG. 9A–9E are simplified equivalent circuits of the high-voltage generator shown in FIG. 7 at different times throughout the resonance cycle.

Since the circuit shown in FIG. 4 is basically the same as the circuit shown in FIG. 7, where 13a represents the exciting inductance of transformer 13 and 13b represents its leakage inductance, the operation of the high voltage generator will be described referring to FIG. 7 (and FIG. 8 which shows waveforms at various locations in FIG. 7). Assuming that main switch 16a performs a switching operation with a prescribed frequency, for example 10 kHz, and a prescribed pulse width (Ton), so that the circuit reaches a steady state, the voltage Vc across resonant capacitor 18 is zero just before main switch 16a conducts, and the terminal voltage Eout of capacitor 14 (electrostatic capacitance of the high voltage cable to the X-ray tube) is constant. It is also assumed that switches 16a and 16b are mutually synchronized, so that they switch ON simultaneously as shown in waveforms 204 and 205 in FIG. 8. Thus, when these switches 16a and 16b are both conducting (Ton), the terminal voltage Eout of capacitor 14 can be regarded as that of cell 14a, and the equivalent circuit is as shown in FIG. 9A. The current $i_1$ flowing through exciting inductance 13a of transformer 13 increases with time t as shown in waveform 200 in FIG. 8, with the ratio Ein/L1 of the voltage Ein of power source 11 to the value L1 of inductance 13a as coefficient. The current I2 flowing through leakage inductance 13b of transformer 13 has the waveform 202 shown in FIG. 8, with the ratio (Ein-Eout)/L2 of the difference (Ein-Eout) between the input voltages and the value L2 of inductance 13b as its coefficient. The current flowing during the time Ton in switch elements 16a and 16b is therefore the sum of the above currents, namely, $$T_{on}(Ein/L1) + T_{on}(Ein-Eout)/L2.$$

Figure 9B:
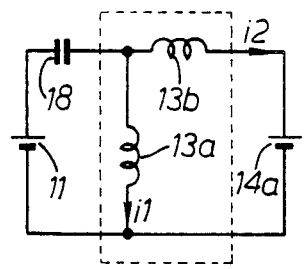
Figure 9C:
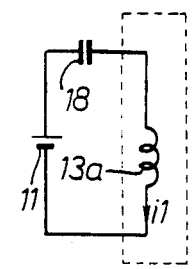

After main switch 16a opens, an inertial current flows in leakage inductance 13b for the period $T_1$. Thus the equivalent circuit in the period $T_1$ is as shown in FIG. 9B. The current $i_1$ which was previously flowing in exciting inductance 13a now charges resonant capacitor 18 through input voltage source 11. The inertial current flowing in leakage inductance 13b also charges resonant capacitor 18 from cell 14a through input voltage source 11. During the time $T_1$ therefore, the voltage Vc across resonant capacitor 18 rises as energy is stored in it (see waveform 201 in FIG. 8), in a condition of resonance determined by the capacitance of capacitor 18 and the harmonic mean of inductances $L_1$ and $L_2$. Subsequently, when the inertial current that was flowing in leakage inductance 13b disappears, the voltage across leakage inductance 13b drops to zero and the bridge rectifier in the load circuit turns "off". The equivalent circuit is then a single mesh comprising resonance capacitor 18 and exciting inductance 13a, as shown in FIG. 9C.

Figure 9D:
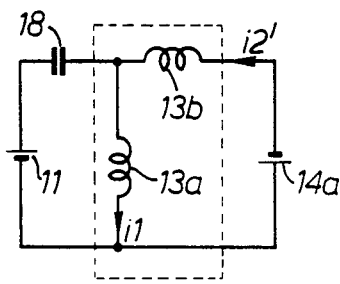

The inertial current that flows in exciting inductance 13a continues to flow into resonant capacitor 18 through source 11. The voltage across exciting inductance 13a gradually decreases, and when this voltage becomes lower than the voltage of equivalent cell 14a (time $t_1$), a voltage of opposite polarity comes to be applied to bridge rectifier 74 of load circuit 12. The result is that bridge rectifier 74 conducts, and the equivalent circuit is then as shown in FIG. 9D. A part current $i_2'$, of the inertial current $i_1$ that was stored in exciting inductance 13a, now flows into cell 14a, and the rest ($i_1 - i_2'$) flows into resonant capacitor 18 through source 11. If the switching period of main switch 16a is Tmax and the period for which damping diode 17a conducts is $T_3$, the period between $t_3$ and $t_1$ may be expressed as $$(Tmax - T_3) - (Ton + T_2).$$

Thus when the charging of resonant capacitor 18 is completed and its terminal voltage Vc has reached a maximum voltage Vcmax, the charge stored in capacitor 18 returns through cell 14a and inductance 13b from source 11 as energy is released from the capacitor. As it goes into this resonance stage, the terminal voltage Vc of capacitor 18 soon forward-biases damping diode 17a. Thus the currents flowing in the respective inductances 13a and 13b are regenerated in source 11 through damping diode 17a.

The above description covers the circuit operation when main switch 16a and auxiliary switch 16b turn ON simultaneously and auxiliary switch 16b continues its ON state for a full cycle, which is substantially equal to a circuit without the auxiliary switch. Thus, utilizing the voltage resonance action of resonance capacitor 18, power will be transmitted by the voltage waveform describing a resonance arc.

Consider now the situation if, in such an arrangement, in order to alter the amount (voltage) of power supplied to load 12, we simply alter the pulse width (Ton) of main switch 16a or its switching cycle. First we shall investigate the effect of varying the instant at which main switch 16a closes, under the conditions that the pulse width Ton of main switch 16a is constant and load 12 is constant, the variation being such as to maintain the aforesaid voltage resonance condition satisfied. As shown in waveform 201 of FIG. 8, over the range from the time Tmin to the time Tmax, the terminal voltage Vc of resonance capacitor 18 that exhibits the aforesaid resonance effect would have values (but for diode 17a) as shown by the broken line in the Figure. Even if the next switching cycle were to start during this period, there is no possibility of a sudden current flow in main switch 16a because of the conduction of main switch element 16a. However, if the next cycle starts outside this period, for example if the cycle time Tb is longer than switching period Tmax, as shown in FIG. 8, capacitor 18 will again be charged with a positive potential through exciting inductance 13a and auxiliary switch element 16b, which is now in a conducting condition. This voltage $V_B$ is applied to both terminals of main switch 16a. Consequently, this voltage $V_B$ is short-circuited by the conduction of main switch 16a, whereupon an unusually large current spike X flows in main switch 16a. This signifies increased transition loss for main switch 16a, and, if its extent is severe, may risk its destruction. The limit involved in setting the maximum switching period while maintaining resonance conditions of the circuit is therefore the Tmax referred to above.

Figure 8:
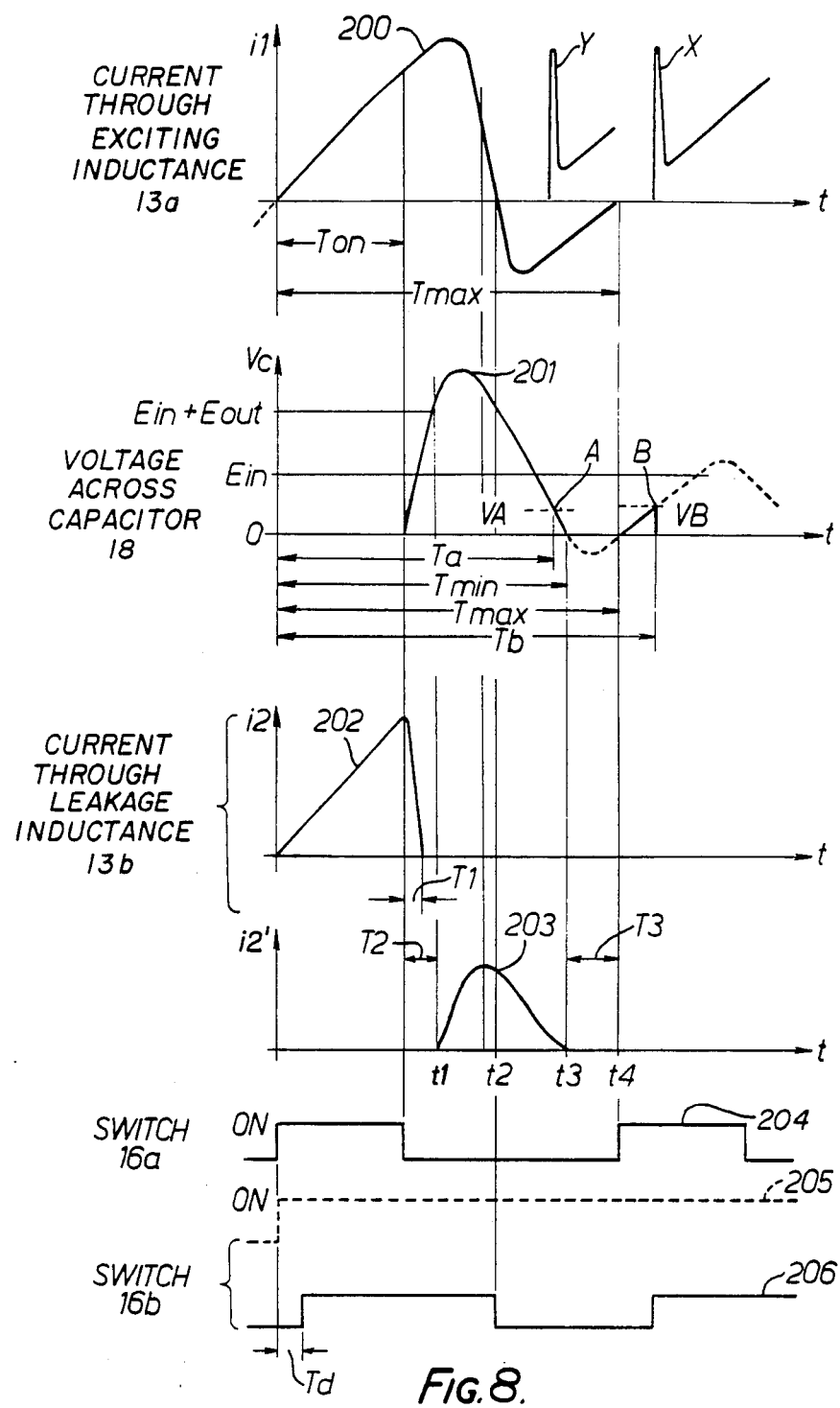
FIG. 8 is a diagram showing voltage and current waveforms at various locations in the circuit of FIG. 7.

On the other hand, if the switching period is shorter than Tmin, say Ta, as shown in FIG. 8, capacitor 18 will be left with a positive potential $V_A$ as shown at the point A, with the result that main switch 16a will conduct. In this case also main switch 16a therefore short-circuits the above voltage $V_A$, with the result that a current spike Y flows, as in the example explained above, causing increased transition loss. Thus there is the same risk of destroying switch 16a. The minimum limit for the above switching period is therefore Tmin.

The result of this is that the range of permissible variation of the switching period is from Tmin to Tmax, and the ratio between the maximum and minimum values of power being supplied to the X-ray tube is about 5. This is one reason why the amount of power supplied in a voltage resonance switching type power supply circuit cannot be altered over a wide range without an auxiliary switch.

Figure 9E:
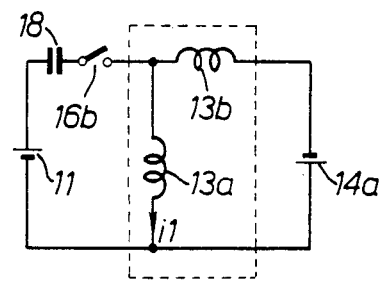

To deal with this problem, auxiliary switch 16b is inserted in the above circuit in series with main switch 16a and its associated diode 17a and resonance capacitor 18. One alternative is that, after main switch 16a has been closed auxiliary switch 16b may be closed (FIG. 9E) within the period of conduction Ton of the main switch but delayed by a fixed amount Td, as shown in waveform 206 of FIG. 8. Another alternative is that the auxiliary switch is closed simultaneously with main switch 16a (i.e. Td=0); and auxiliary switch 16b opens at a selected time between the time $t_2$ at which the current $(i_1 - i_2')$ flowing in auxiliary switch 16b becomes zero and the time $t_4$ at which this current again starts to flow. In this alternative, auxiliary switch 16b opens when current $i_1$ becomes zero.

As explained previously, the reason why an abnormal current X is generated when the switching period is altered from Tmax to Tb is that, during the time between Tmax and Tb, main switch 16a is open, so the closed circuit consisting of power source 11, capacitor 18, and transformer 13 supplies current from power source 11 to capacitor 18, charging it. As a corrective measure, auxiliary switch 18b is connected in series with resonance capacitor 18 thereby preventing charging of the capacitor 18 by opening this closed circuit shown in FIG. 9E, at least from Tmax until Tb. The result is that the voltage Vc across capacitor 18 can be maintained at zero even after Tmax. This prevents the resonance current from recharging resonance capacitor 18. The result is that there is no possibility of surge current flow when main switch element 16a conducts; i.e. the spike waveform X or Y shown in FIG. 8 is prevented from occurring, and the circuit oscillation conditions can be maintained unaltered.

If auxiliary switch 16a closes at the same time as main switch 16a, the supply of power to load 12 can be controlled by altering the switching cycle within the range Tmin to Tmax, referred to above. The amount of power supplied can also be altered by delaying the conduction timing of the auxiliary switch while maintaining the resonance conditions as mentioned above. It is therefore possible to adjust the power supply within a wide range by controlling this delay time. Thus, the amplitude (intensity) of X-ray pulses can be designated by supplying delay data from system controller 400 corresponding to each mode.

Figure 10:
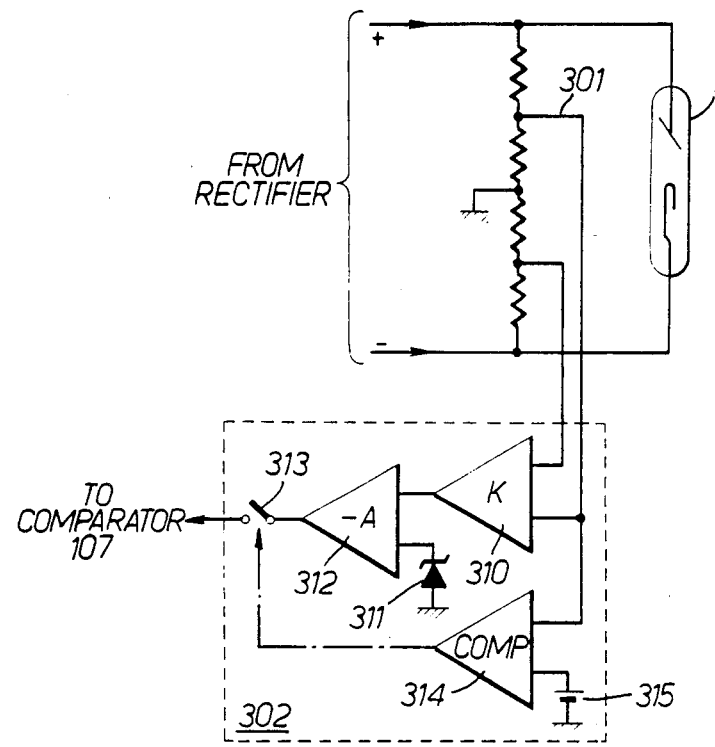
FIG. 10 is a partial schematic diagram illustrating a negative feedback arrangement to control and stabilize the supply voltage to the X-ray tube of FIG. 4.

Moreover, with such an inverter, the supply voltage to the X-ray tube 1 can be stabilized in a very easy and effective manner by detecting this supply voltage and using it to provide negative feedback control of the delay time Td of auxiliary switch 16b as shown, for example, in FIG. 10.

The high voltage being supplied to the X-ray tube 10 is detected by voltage divider 301 and then feed back, by feedback circuit 302, to comparator 107 in FIG. 5. Feedback circuit 302 is a negative feedback loop comprising a coefficient circuit 310, a Zener diode 311, an error amplifier 312, a switch 313 and a comparator 314. Coefficient circuit 310 consists of an operational amplifier to receive the detected voltage from voltage divider 301 and to amplify it by a predetermined coefficient K. Both the output of coefficient circuit 13a, and a reference voltage regulated by Zener diode 311, are supplied to error amplifier 312 (also an operational amplifier). Error amplifier 312 outputs an error voltage representing the difference between the reference voltage and the output of the coefficient circuit 310. When switch 313 is closed, this error voltage is supplied to comparator 107 as the delay time control signal instead of the output of D/A converter 108. Switch 313 and comparator 314 combine to operate the negative feedback loop in a nonlinear fashion. Comparator 314 compares the detected voltage with a standard voltage 315 whose magnitude corresponds to 90% of the rated or target voltage of X-ray tube 10 and outputs a control signal to switch 313 when the detected voltage is higher than the standard voltage. The switch is OFF whenever the detected voltage is less than the standard voltage, so that the negative feedback loop is open. When the supply voltage to X-ray tube 10 reaches 90% of the target voltage, comparator 314 outputs the control signal and switch 313 turns ON, closing the negative feedback loop.

The error voltage from error amplifier 312 is used for controlling the length of the delay time Td. When the detected voltage is less than the reference voltage, it shortens the delay time Td in response to the error voltage. Delay time Td is lengthened when the detected voltage is greater than the reference voltage.

The auxiliary switch 16b is used for changing the duty cycle of power supplied by the high frequency inverter circuit. Thus, it is possible for the inverter circuit to change the amount of power, and therefore, the voltage supplied to the X-ray tube, merely by changing the conductive timing (i.e., the delay time Td) of the auxiliary switch in regard to that of the main switch.

Furthermore, by on-off control of the power supply to the output can be turned sharply ON or OFF while maintaining the resonance condition of the inverter, and a good rise characteristic of less than 1 ms can be obtained. This is very desirable in particular if a non-linear feedback loop is formed in the control system of auxiliary switch 16b, since an excessive response of this control system can be effectively prevented.

Thus, as explained above, with a device according to this invention in which a resonance type high-frequency inverter is used as the high voltage generator 6 for the X-ray tube, good pulsed X-rays can be generated by supplying pulsed electric power to the X-ray tube 1 in synchronism with the processing operation of image processor 4 but without needing to use a high-voltage tetrode. Also, it is possible to cope satisfactorily with cases where diagnostic images are required to be obtained at short intervals, since the inverter is capable of high-speed operation, giving pulsed power with a rapid rise. Consequently, X-ray diagnosis can be carried out very effectively while keeping the X-ray dose low.

Figure 11:
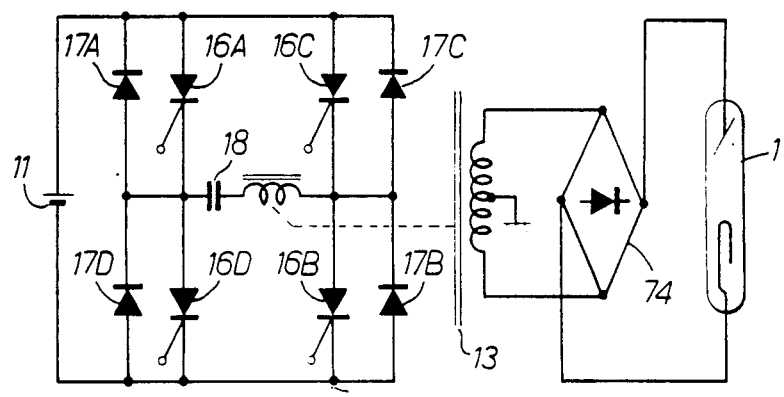
FIG. 11 is a schematic diagram of another embodiment of the high-voltage generator of FIG. 3.
Figure 12:
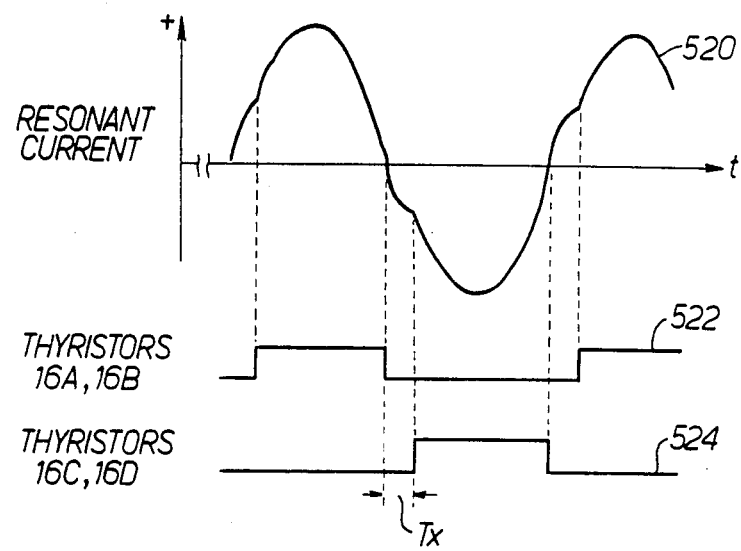
FIG. 12 is a diagram illustrating the switching times of the thyristors, and the resultant current waveform, in the high-voltage generator of FIG. 11.

FIG. 11 is a schematic diagram of another embodiment of high voltage generator 6, employing a current-resonance-type inverter. A first pair of thyristors, 16A and 16B, and a second pair of thyristors, 16C and 16D, alternately switch ON and OFF. When the first pair is ON and the second pair is OFF, current flows through input voltage source 11, thyristor 16A, resonance capacitor 18, and the primary winding of transformer 13. At this time, the current in the series resonance circuit consisting of capacitor 18 and the transformer primary winding is shown as curve 520 in FIG. 12. When this current drops below zero, thyristors 16A and 16B switch OFF, so that current flows out of the primary winding through capacitor 18, diode 17a, source 11, and diode 17b. Next, when thyristors 16C and 16D turn ON, current continues to flow in the same direction through the transformer primary winding and capacitor 18, and then flows through thyristor 16D, source 11, and thyristor 16C. When this current rises above zero, thyristors 16C and 16D turn OFF, and current then flows through capacitor 18, the transformer primary winding, diode 17C, source 11, and diode 17D. The switching waveforms for thyristors 16A-16D of FIG. 11 are shown as waveforms 522 and 524 in FIG. 12. Control of the power supplied to X-ray tube 1 is possible by changing the frequency of these switching waveforms or the time $T_x$ during which all thyristors are turned OFF.

Figure 13:
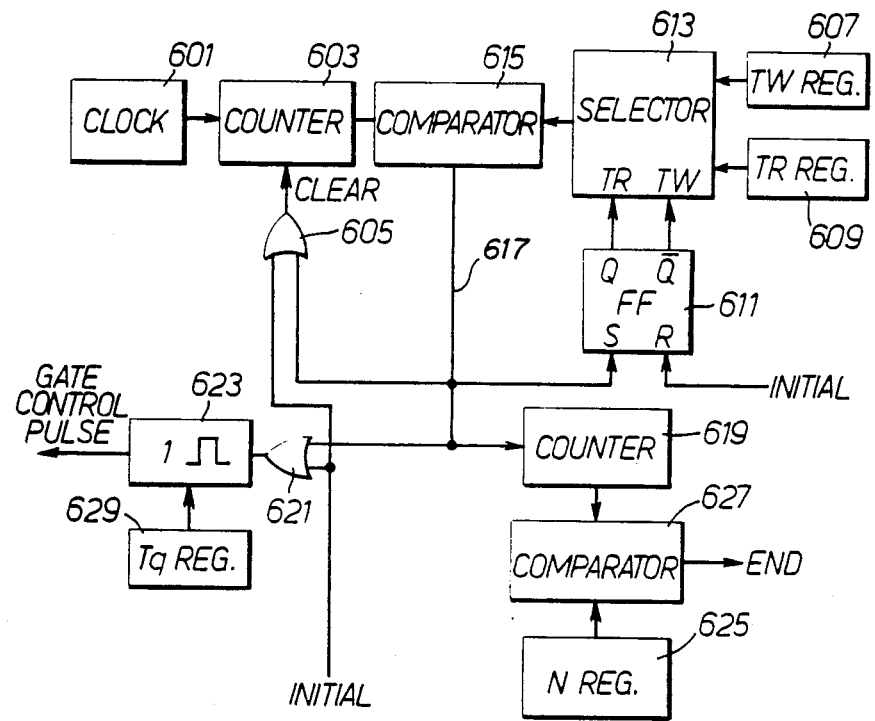
FIG. 13 is a block diagram of one embodiment of the X-ray controller of FIG. 3.

FIG. 13 is a block diagram of one possible construction of controller 7 using a combination of counters and pulse generators. (The portion of controller 7 which merely supplies digital delay data has been omitted for simplification.) Clock 601 supplies clock pulses at a rate determined by the desired accuracy of X-ray pulse timing. When image processor 4 is activated to begin making X-ray exposures of patient 2, system controller 400 applies an initial pulse to counter 603 via OR gate 605. The initial pulse resets, or clears, counter 603 which then begins counting clock pulses. The initial pulse also passes through OR gate 621 to monostable multivibrator 623, which outputs the mask pulse. System controller 400 stores the correct values $T_w$ and $T_r$, respectively, in registers 607 and 609. ($T_w$, it will be recalled, is the time between the leading edge of the mask pulse and the leading edge of the first contrast pulse. $T_r$ is the time between the leading edges of successive mask pulses.) The initial pulse from system controller 400 also resets flip-flop 611, which causes selector 613 to select the $T_w$ value for output. Comparator 615 continuously compares the output of selector 613 with the value being counted by counter 603; when the value in counter 603 equals or exceeds the value output from selector 613, comparator 615 outputs a pulse on line 617. This pulse performs four separate functions. First, it sets flip-flop 611, which causes selector 613 to select the value in the $T_r$ register for output. Second, it resets counter 603 through OR gate 605. Third, it increments counter 619, which will be explained below. Finally, through OR gate 621, it actuates monostable 623 to output the first contrast pulse. $T_q$ register 629 stores the value of $T_q$, the pulse width, and causes pulses output by monostable 623 to end at a time $T_q$ after they begin. N register 625 stores a number representing the total number of X-ray pulses to be produced. Comparator 627 continuously compares the value stored in register 625 with the value in counter 619. When the latter equals or exceeds the former, comparator 627 outputs an end pulse to system controller 400, which stops the exposure process.

Figure 14:
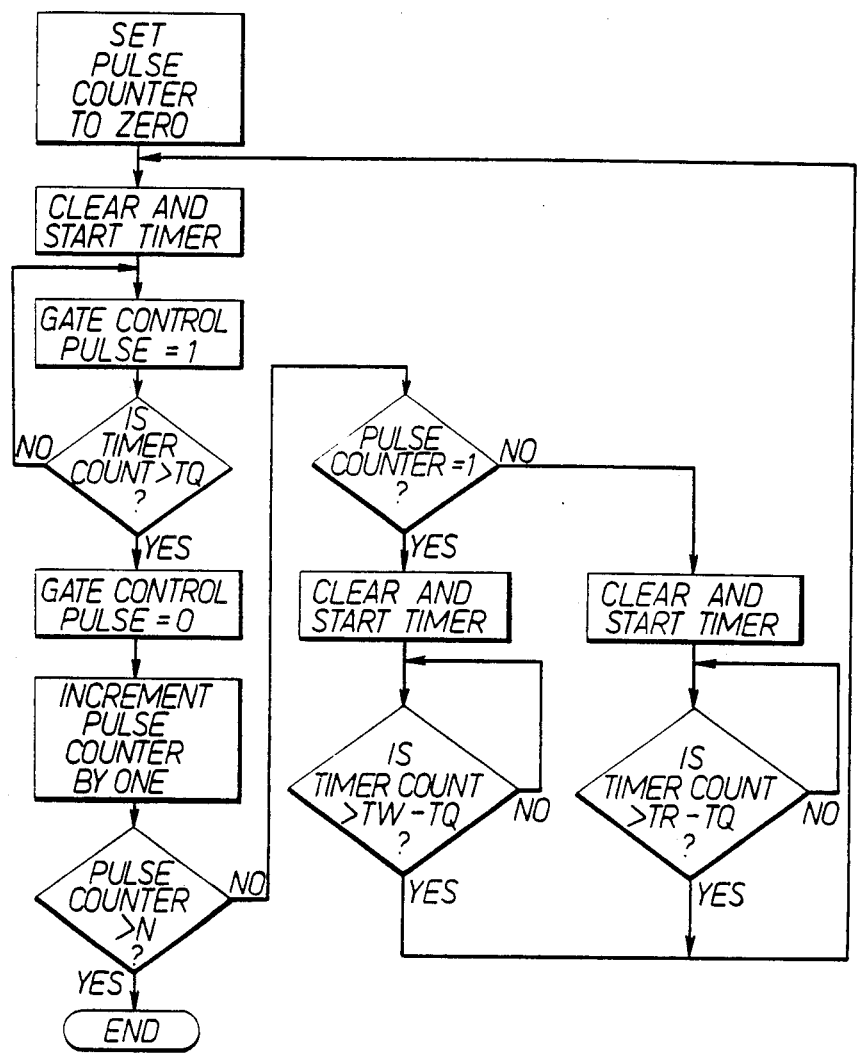
FIG. 14 is a flowchart for the program which would implement another embodiment of the X-ray controller of FIG. 3.

FIG. 14 is a flow chart of the program which would implement controller 7 in the form of a microprocessor. (Once again, the step of simply supplying digital delay data to D/A converter 108 has been omitted for simplicity.) The microprocessor requires both a timer and a pulse counter. Both are initially set to zero. When the mask pulse is to begin, the timer is started, and the active high logic level is established on the gate control pulse line (the gate control pulse is set to one). The timer is then continually monitored to determine when it reaches a count greater than $T_q$, the pulse width. When that occurs, the active low logic level is established on the gate control pulse line (the gate control pulse is set to zero), and the pulse counter is incremented by one, indicating that a pulse has been sent. Whenever the pulse counter exceeds N, all the desired mask and contrast pulses have been sent, and X-ray exposures are stopped. If the pulse counter indicates a count less than or equal to N, the program determines whether exactly one pulse (the mask pulse) has been sent. If it has, the timer is cleared and started until it reaches a count of $T_w$ minus $T_q$, the time between the trailing edge of the mask pulse and the leading edge of the first contrast pulse. At that time, the timer is again cleared and started, and the first contrast pulse is sent. If the pulse counter indicates that more than one pulse has been sent, the timer is cleared and restarted until it reaches a count of $T_r$ minus $T_q$, the time between the trailing edge of one contrast pulse and the leading edge of the next. At that time, the timer is again cleared and started and the next contrast pulse is sent.

Although illustrative embodiments of the present invention have been described in detail with reference to the accompanying drawings, it is to be understood that the invention is not limited to those precise embodiments and that various changes and modifications may be effected therein by one skilled in the art without departing from the scope or spirit of the invention.

What is claimed is:

1. Digital radiography apparatus for displaying an X-ray transmission image of an object, comprising:
a source of pulsed electrical power for generating direct current pulses having a voltage above a predetermined voltage value, said source of pulsed electrical power including an inverter, said inverter having a direct current power supply connected in series with a main switch to alternately open and close in response to a main switching signal having a frequency above a first predetermined frequency value, said inverter generating alternating current electrical pulses whose frequency is above a second predetermined frequency value in response to said main switching signal, and a transformer having a primary and a secondary winding, said main switch connected to the primary winding of said transformer to increase the voltage of the alternating current electrical pulses, and a rectifier connected to the secondary winding of said transformer to convert the increased-voltage alternating current electrical pulses to the direct current pulses;
a source of X-rays receiving the direct current pulses to generate pulsed X-rays;

detection means positioned to receive the pulsed X-rays transmitted through the object for converting the X-ray transmission image to a digital image;

processing means connected to said detection means for mathematically manipulating the digital image;

display means connected to said processing means for converting the mathematically manipulated image to a visible image; and control means coupled to said processing means for driving said source of pulsed electrical power, said control means including first means for generating a plurality of control pulses whose duration corresponds to the duration of said pulsed X-rays, second means for generating a pluralty of pulses as the main switching signal to be supplied to said main switch, and gating means coupled to said first and said second means for regulating the supply of said main switching signal to said main switch in response to said control pulses 2. The digital radiography apparatus of claim 1 wherein said detection means converts a plurality of X-ray transmission images to digital images and said processing means subtracts one of the digital images from another one of the digital images to produce the mathematically manipulated image.

3. The digital radiography apparatus of claim 2 wherein said inverter further having:

a resonant capacitor in parallel with said main switch to store and release energy cyclically; and a damping diode in parallel with said capacitor and said main switch to permit current to bypass said main switch in one direction.

4. The digital radiography apparatus of claim 3 wherein said control means further generates an auxiliary switching signal having a frequency above a third predetermined frequency value and having a predetermined phase relationship with the main switching signal, said inverter further having:

an auxiliary switch in series with said main switch, said direct current power supply and said primary winding to alternately open and close in response to the auxiliary switching signal; and an auxiliary damping diode in parallel with said auxiliary switch to permit current to bypass said auxiliary switch in one direction.

5. The digital radiography apparatus of claim 4 wherein the predetermined phase relationship is a delay and said control means further includes:

delay means responsive to parameter data received from said processing means for determing the delay.

* * * * *